United States Patent [19]

Springer et al.

[11] 4,411,101
[45] Oct. 25, 1983

[54] APPARATUS AND METHOD FOR HEATING THE ROOT ZONE OF PLANTS

[76] Inventors: Edward A. Springer; Ronald D. Smith, 611 Mountain View Ave., both of Petaluma, Calif. 94952

[21] Appl. No.: 293,681

[22] Filed: Aug. 17, 1981

[51] Int. Cl.³ .............................................. A01G 13/00
[52] U.S. Cl. .......................................................... 47/2
[58] Field of Search .................... 165/46; 47/2, 27, 29, 47/17, 19, 1; 126/448

[56] References Cited

U.S. PATENT DOCUMENTS

| | | | |
|---|---|---|---|
| 3,470,943 | 10/1969 | Van Huisen | 47/2 X |
| 3,521,699 | 7/1970 | Van Huisen | 47/19 X |
| 3,727,345 | 4/1973 | Smith | 47/2 |
| 3,863,710 | 2/1975 | Masters | 47/2 X |
| 3,893,507 | 7/1975 | MacCracken | 165/46 |
| 4,112,921 | 9/1978 | MacCracken | 126/448 |
| 4,159,595 | 7/1979 | Dalle et al. | 47/2 |
| 4,270,596 | 6/1981 | Zinn et al. | 165/46 |

FOREIGN PATENT DOCUMENTS 2060341  5/1981  United Kingdom ............... 47/2

*Primary Examiner*—Robert E. Bagwill
*Attorney, Agent, or Firm*—Manfred M. Warren; Robert B. Chickering; Glen R. Grunewald

[57] ABSTRACT

An apparatus and method for root zone heating of plants is disclosed. The apparatus includes an array of flexible, individually movable, plastic tubes which are positioned under the plant root systems. The tubes are preferably formed of EPDM plastic enabling their use with water from geothermal and solar pond sources, as well as conventional sources.

1 Claim, 3 Drawing Figures

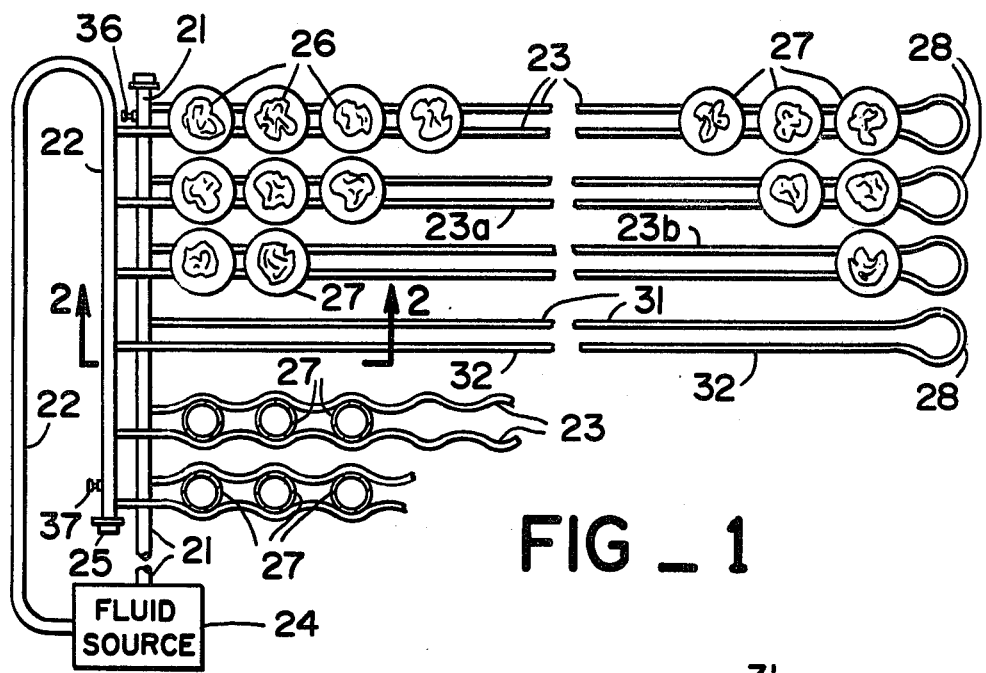
FIG_1
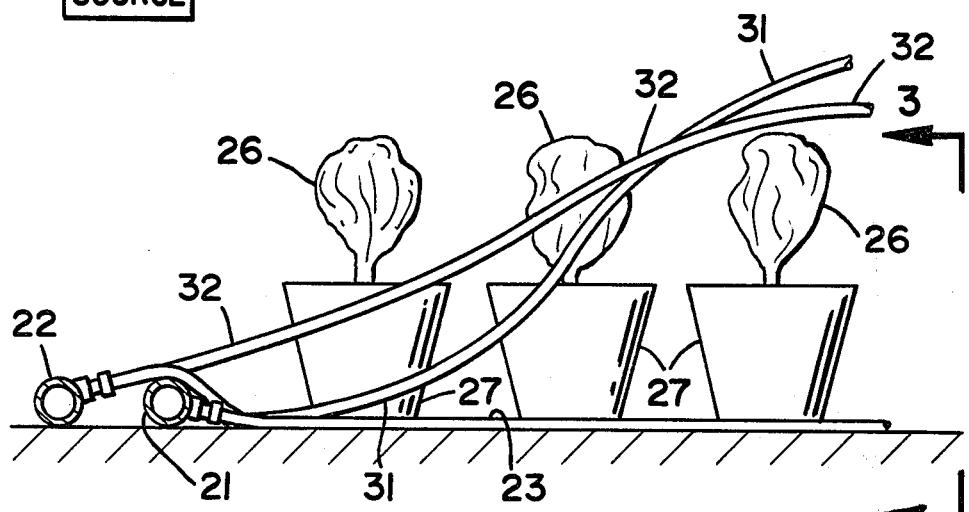
FIG_2
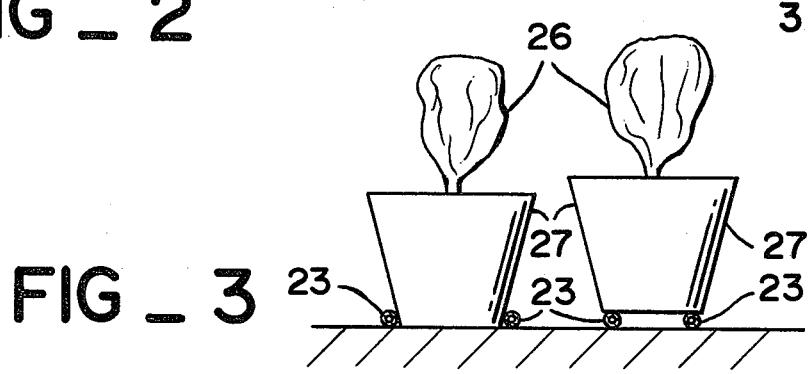
FIG_3

APPARATUS AND METHOD FOR HEATING THE ROOT ZONE OF PLANTS

BACKGROUND OF THE INVENTION

As the cost of energy increases, more pressure is being brought to bear on energy efficiency in connection with the growing of plants in greenhouses or other enclosed and energy-controlled environments. It is now widely recognized in the industry that one of the most efficient ways of growing plants is to heat the root zone or system of the plants, rather than to attempt space heating of the air around the plants. Thus, considerable work has been undertaken recently in connection with water-based heating systems which are installed underneath plant containers or in propagation benches or beds.

Root heating systems have been found to achieve heat energy savings between about 35% and as much as about 78%, as compared to conventional space heater systems. Prior root heating systems, however, have also been accompanied by a significant increase in the system installation costs, as compared to space heaters.

Typical of the root zone heating apparatus which has previously been marketed is the system marketed under the trademark FLEXITWIN by Calmac Manufacturing Corporation of Inglewood, N.J. This system employs pairs of polyethylene tubes, which in fact are not very flexible and which are connected to input and outlet headers for the flow of water at an elevated temperature through the tubes. The tubes are extruded together as a unit with abutting side-by-side channels, and a copper or similar U-shaped fitting is mounted and secured in the far end of the tube to provide a continuous loop. A feature of this system is that the counterflow of heated water in the abutting tubes purportedly evens out or averages out the temperature differences so that at any position along the pair of tubes the temperature is essentially the same.

Another approach in the prior art has been to employ a solar panel mat in which there are a plurality of side-by-side plastic tubes interconnected by a webbing and positioned under the plant root system or zone. While substantial energy savings can be attained through use of a mat-type root heating system, the initial cost of the system is undesirably high.

In recent years another consideration has become more important in connection with greenhouse heating. While greenhouses have the advantage of eliminating transportation costs since they can be located in almost any climate proximate large populations, they still have a relatively low priority with regard to the use of conventional energy sources. Thus, oil, gas and liquid petroleum heating units are still in widespread use to heat greenhouses, but there is also considerable pressure to enact laws and codes which would limit or prohibit use of such conventional energy sources as the basis for greenhouse heating systems. Accordingly, the future for greenhouse heating appears to reside in the use of energy sources such as solar energy, solar ponds, geothermal sources, and the like.

Many of these alternate energy sources, however, inherently create new technological problems which have not been addressed or resolved in prior root heating systems. Thus, both solar ponds and geothermal sources produce water at an elevated temperature which includes a very high percentage of corrosive materials. Polyethylene tubing of the type conventionally employed heretofore in greenhouse heating systems is not capable of withstanding the corrosives in geothermal water nor the brine in solar ponds. One way of dealing with the brine from solar ponds or the naturally occurring corrosives in geothermal water is to provide a heat exchanger which is then used to isolate the energy source from the greenhouse heating system. This approach, however, obviously adds to the overall system cost. Copper tube systems will withstand higher temperatures, but they are subject to corrosion, and the cost of such systems is very substantial. High molybdenum content stainless steel will withstand both the temperatures and corrosion, but the cost of providing substantial quantities of tubing out of such a material is prohibitive.

The efficiency of solar panels diminishes significantly as water temperature increases. Accordingly, relatively large collectors are required to achieve high temperature output water. Thus, a heating system which can employ low temperature solar panel heated water, will effect a significant cost savings in the cost of solar panels.

Another problem which has existed with prior radiant heating systems for plants has been the need to provide auxiliary space heaters for installations in very cold climates. While root zone heating systems are more efficient in producing a unit of plant growth, in northern climates the air temperature in the greenhouse can be so low as to require space heating around the plants, in addition to root zone heating, in order achieve the necessary plant growth. In climates where the outside temperature may be at or below 0° F., for example, some space heating of the greenhouse is required in addition to the root heating.

Most prior systems have used a belt-and-suspenders approach by providing separate space heaters to augment the root heating system. This will, of course, undesirably increase the initial installation cost.

OBJECTS OF THE INVENTION

Accordingly, it is an object of the present invention to provide an apparatus and method for root zone heating of plants which is constructed in a manner enabling a substantial savings in the initial investment as well as savings during operation.

Another object of the present invention is to provide an apparatus and method for heating root systems and for heating the air around the plants when required.

Still a further object of the present invention is to provide an apparatus and method for root heating of plants which can be employed with non-conventional energy sources such as solar ponds and geothermal energy sources, as well as conventional boilers, refrigeration units, and wood and coal burners.

Another object of the present invention is to provide a root zone heating apparatus having enhanced corrosion resistance and durability.

A further object of the present invention is to provide a root zone heating apparatus and method which is adaptable to a wide range of applications and existing facilities, is easy to install and maintain, and is highly efficient in its operation.

SUMMARY OF THE INVENTION

The apparatus of the present invention for root zone heating of plants includes input manifold means, outlet manifold means and an array of fluid-conveying heating tubes each coupled to the manifolds for flow of heating fluid therethrough. The improvement in the apparatus comprises, briefly, of formation of the tubes from a flexible plastic material with adjacent tubes in the array being relatively spaced apart over substantially the entire lengths of the tubes and the adjacent tubes being independently movable over substantially their entire lengths. The improved method of the present invention is comprised of placing the plants on an array of tubes in which the tubes are spaced apart and independently movable and are preferably formed of elastomeric terpolymers of ethylene, propylene and diene monomers.

DESCRIPTION OF THE DRAWINGS

FIG. 1 is a top plan view of a schematic representation of apparatus for radiant root heating of plants constructed in accordance with the present invention.

FIG. 2 is an enlarged, fragmentary, side elevational view of the apparatus of FIG. 1 taken substantially along the plane of line 2-2 in FIG. 1.

FIG. 3 is a side elevational view taken substantially along the plane of line 3-3 in FIG. 2.

DESCRIPTION OF THE PREFERRED EMBODIMENT

The heating apparatus for plants of the present invention has some elements in common with prior art systems. Referring to FIGS. 1 and 2, the apparatus of the present invention can be seen to include input manifold means 21, outlet manifold means 22 and an array of fluid-conveying heating tubes 23 coupled to the manifolds for the flow of the heating fluid, usually water, through the array. Manifolds 21 and 22 are in turn coupled to a fluid source, generally designated 24, which is schematically represented and would normally include means for urging the fluid through the array (such as a pump which is not shown).

Superimposed over the array of tubes 23 is a plurality of plants 26 here shown growing in individual growing containers 27, although it will be understood that flats of plants may also be positioned over tubes 23. The apparatus of the present invention is particularly well-suited for root heating of plants grown in containers, but it may also be employed in a propagation bench or bed with the array of tubes 23 buried in the plant growth medium, sand, gravel or even concrete.

As is true of some prior art systems, it is preferable that manifolds 21 and 22 be provided on one side of the array with tubes 23 being formed as loops which extend from the input manifold along an outwardly extending portion or leg 23a to the far or U-shaped ends 28 of the array and then return by a return portion or leg 23b to the outlet manifold 22. This construction results in a temperature gradient from the inlet manifold to the U-shaped end 28 and a temperature gradient from end 28 to outlet manifold 22 which are in opposite directions. Accordingly, adjacent tubes have temperature gradients in opposite directions, which tends to even out the temperature over the array to which the plant root systems are exposed. In the prior art FLEXITWIN double tube system, the two adjacent tubes are in contact with each other over the entire length so as to cause the temperature along the lengths of the pairs of tubes to be essentially uniform.

It should be understood that it is possible to provide pairs of manifolds on either side of the array so that adjacent tubes will merely extend from one side to the other without looping back. This approach does increase the installation cost and has not been found to be necessary. The manifold construction shown in the drawing in which return manifold 22 is capped at end 25 and loops back to the source reduces any tendency for the water to "short circuit" or have the majority of the flow pass through the loops 23 closest to source 24.

In the improved heating apparatus of the present invention, however, tubes 23 are not in abutting relation to each other, and more particularly, adjacent tubes 23 in the array are relatively spaced apart over substantially the entire lengths of the tubes. Still further, the tubes are formed of a flexible plastic material and are independently movable over substantially their entire lengths to afford the apparatus of the present invention several important advantages over prior art systems.

While heating systems in which the tubes are in contact with each other over the length thereof or are connected by webbings has the advantage of greater uniformity of heating temperature, it has a substantial cost disadvantage. It has been found that the assumed advantage of uniformity of heating over the array as a result of contact between adjacent tubes is relatively insignificant as compared to the cost disadvantage of having two tubes where one would suffice. While separation of the tubes does result in some modest uneven heating, that effect is essentially eliminated by the fact that the heat must travel through containers 27 and the growing medium in which the plant roots are contained before heating the roots. Accordingly, temperature differentials between the outwardly extending portion 23a and return portion 23b of the tubes tend to be evened out by heat transfer in container 27 and the growing medium.

As best may be seen in the right-hand side of FIG. 3 and the top of FIG. 1, it is often advantageous to space tubes 23 at a lateral distance from each other which would support container 27 on the edges of the container. As thus supported, the container will assume a level orientation and heating will be essentially uniform. In a typical installation, water temperature in inlet manifold 21 will be injected into tubes 23 at about 105° F. and will return to manifold 22 at about 90° F. for an array having a length to U-shaped ends 28 of about 100 feet. As will be seen, therefore, even in the worst case, the temperature differential is only about 15°, which differential will easily be evened out by heat transfer through containers 27. The plants, therefore, are not subjected to hot spots through use of the apparatus of the present invention. Moreover, the cost of tubing is essentially cut in half since twin tube systems must place a pair of tubes at each of the edges of containers 27 in order for the pots to be supported in a level orientation on the radient heating tubes.

Another important advantage results from the apparatus of the present invention. In extremely cold climates, it is necessary to provide some space heating of the air around the plants. The apparatus of the present invention is particularly well suited to provide this type of heating as well as root heating of the plants. Moreover, the apparatus of the present invention is suitable for use with fluid sources which are at a wide range of temperatures. Geothermal water, for example, may have a temperature of 190° or higher, while solar panel water may have a temperature of under 100°.

In the apparatus of the present invention the independently movable tubes 23 can be positioned under the plant root systems as shown in FIG. 2 and the right-hand side of FIG. 3; or the tubes may be placed alongside or even above containers 27. When positioned under containers 27 heat transfer by conduction and radiation to the container and growing medium in which the roots are growing is substantial, and heat transfer to the surrounding air relatively insubstantial. This is an approach which is particularly well suited to low-temperature heat or fluid sources 24 and applications in which the surrounding air temperature of the greenhouse is relatively moderate. When high-temperature fluid is being pumped into the system or when the air temperature in the controlled environment would otherwise be relatively cold, the tubes 23 can be positioned alongside containers 27 as shown on the left-hand side of FIG. 3 and the bottom portion of FIG. 1. Thus, tubes 23 are displaced outwardly to allow the pots or containers to be placed between the tubes instead of over the tubes. This will result in conduction and radiant heat transfer to container 27 and the growing medium, but it will also produce greater convection heat transfer to the air surrounding the plants. This greater heat transfer to surrounding air allows higher temperature to be used in the tube array without burning up the plants.

Additionally, the flexible and independently movable tubes can be periodically employed solely as space heaters. This is accomplished, for example, by lifting a loop such as the outwardly extending tube portion 31 and the return tube portion 32 upwardly from the array to an elevated position over the plants, as best may be seen in FIG. 2. The loop may be held in an elevated position over the plants by hangar arms (not shown) so that the system is used not only for root heating, but as a space heater. The loops used for space heating can either be specially provided at intervals which would not interrupt the spacing of the root heating tubes or can be provided by simply periodically elevating a loop which could otherwise be used as a root zone heating tube.

It has been found that it is preferable that tubes 23 be spaced from each other by a distance which ranges between about 2.5 centimeters (1.0 inches) to about 7.6 centimeters (3.0 inches). At the close spacing end of this range, the array is particularly well suited for cold climate applications in which very substantial heat loss in the greenhouse can be expected. Closer spacing, however, will cause cost per square foot of array to increase much more rapidly than the advantages of root heating can justify. Spacing much beyond 7.6 centimeters (3 inches) requires that the tubes be run at a water temperature which is undesirably elevated and can locally inhibit plant growth, as well as requiring auxiliary support racks when small containers are employed.

In order to withstand the high temperatures which are sometimes encountered and further to be able to withstand the corrosive chemicals found in fluid sources such as geothermal waters, it is preferable and highly advantageous to form the tubes 23 of the present invention of elastomeric terpolymers of ethylene, propylene, diene monomer (EPDM). The EPDM plastic tubes can withstand temperatures in the range of $-50°$ F. to $+300°$ F., and they are not corroded by extreme salts or brines of the type found in solar ponds and geothermal water. Moreover and very importantly, the EPDM plastic tubes are flexible enabling them to conform to the periphery of containers or be elevated and used as space heaters. The twin tube polyethylene tubes do not have the necessary flexibility.

In the apparatus of the present invention it is preferable to employ relatively small diameter tubes 23. Thus, the tubes will have an outside diameter in the range of about 1.0 to about 0.60 centimeter, with an inside diameter of about 0.75 to about 0.40 centimeters. Headers 21 and 23 are larger in diameter, typically, about 2.5 centimeters internal diameter, and may be formed of EPDM or other corrosion and temperature resistant plastics. Since flexibility of the manifolds is not important, some greater latitude in selecting the manifold material is possible.

In order to bleed air from the system during start-up, vent means 36 and 37 can be provided in headers 21 and 22, respectively. These vents can be provided as fittings in the manifold pipes having capped ends which can be removed during the bleeding operation.

In the improved method of the present invention the plants are placed on an array of heating tubes which are relatively spaced apart and independently movable from each other over substantially the entire length of the tubes. Moreover, the method can include the step of displacing at least one of the tubes from a position in the array below the plant root system to position above the plants for space heating of the air proximate the plants. Finally, in the improved method, the tubes are formed of EPDM and water at an elevated temperature is passed through the tubes directly from a geothermal heat source or a solar pond.

What is claimed:

1. Apparatus for root zone heating of plants comprising:

input manifold means, outlet manifold means, and an array of fluid conveying heating tubes each coupled to said input manifold means and said outlet manifold means for the flow of a heating fluid therethrough, said tubes being substantially cylindrical and being formed of a flexible self-supporting elastomeric terpolymer of ethylene, propylene and diene monomer, adjacent tubes in said array being relatively spaced apart by a distance between about 2.5 centimeters and about 7.6 centimeters over substantially the entire lengths of said tubes and said tubes being positioned adjacent to growing plants, said tubes being independently movable over substantially the entire lengths thereof, and at least some of said tubes in said array being displaced from said array to a position above said array to provide for heating of the air space proximate said plants.

* * * * *